United States Patent
Adams

(10) Patent No.: US 11,299,654 B2
(45) Date of Patent: Apr. 12, 2022

(54) PERMANENT, SELF-ADHERING, SELF-LUBRICATING, ANTI-WEAR COMPOSITE SYSTEM

(71) Applicant: Roller Bearing Company of America, Inc., Oxford, CT (US)

(72) Inventor: Frank Adams, Irvine, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/997,158

(22) Filed: Aug. 19, 2020

(65) Prior Publication Data

US 2021/0054246 A1 Feb. 25, 2021

Related U.S. Application Data

(60) Provisional application No. 62/889,183, filed on Aug. 20, 2019.

(51) Int. Cl.
*C09J 7/40* (2018.01)
*B32B 5/02* (2006.01)
(Continued)

(52) U.S. Cl.
CPC .............. *C09J 7/405* (2018.01); *B32B 5/022* (2013.01); *B32B 5/024* (2013.01); *C09J 7/38* (2018.01);
(Continued)

(58) Field of Classification Search
CPC ........ C09J 7/405; C09J 7/38; C09J 2400/143; C09J 2400/163; C09J 2427/006; C09J 2467/006; C09J 2483/005; B32B 5/022; B32B 5/024; B32B 27/12; B32B 2262/0276; B32B 2262/0253;
(Continued)

(56) References Cited

U.S. PATENT DOCUMENTS 3,950,599 A * 4/1976 Board, Jr. .............. F16C 33/201
442/40
4,156,049 A 5/1979 Hodes et al.
(Continued)

FOREIGN PATENT DOCUMENTS

CN 105298403 6/2017
CN 101396874 11/2017
(Continued)

OTHER PUBLICATIONS

Extended European Search Report issued in corresponding EP Application No. 20191768.9, dated Jan. 19, 2021, pp. 1-6.

*Primary Examiner* — Patricia L. Nordmeyer
(74) *Attorney, Agent, or Firm* — Murtha Cullina LLP

(57) ABSTRACT

An anti-wear composite structure includes an anti-wear layer that has a wear surface opposite an adhesive receiving surface and a thermosetting resin applied to the adhesive receiving surface. The thermosetting resin includes a reactive adhesive configured to bond the anti-wear composite structure to a substrate at an ambient temperature band via pressure-sensitive adhesion. The thermosetting resin has an onset to cure in the ambient temperature band and has a peak cure temperature greater than the ambient temperature band to mechanically and chemically bond the anti-wear composite structure to a substrate.

18 Claims, 5 Drawing Sheets

(51) Int. Cl.
  *B32B 27/12* (2006.01)
  *C09J 7/38* (2018.01)
(52) U.S. Cl.
  CPC ....... *B32B 27/12* (2013.01); *B32B 2262/0253* (2013.01); *B32B 2262/0276* (2013.01); *B32B 2262/101* (2013.01); *B32B 2262/103* (2013.01); *B32B 2405/00* (2013.01); *C09J 2400/143* (2013.01); *C09J 2400/163* (2013.01); *C09J 2427/006* (2013.01); *C09J 2467/006* (2013.01); *C09J 2483/005* (2013.01); *Y10T 428/14* (2015.01); *Y10T 428/1471* (2015.01)

(58) Field of Classification Search
  CPC .......... B32B 2405/00; B32B 2262/101; B32B 2262/103; B32B 7/06; B32B 2581/00; B32B 2571/00; B32B 2260/021; B32B 2260/046; B32B 2262/12; Y10T 428/1471; Y10T 428/14
  See application file for complete search history.

(56) References Cited

U.S. PATENT DOCUMENTS

| | | | |
|---|---|---|---|
| 4,243,462 | A | 1/1981 | Hori et al. |
| 4,923,737 | A | 5/1990 | De La Torre |
| 5,182,166 | A | 1/1993 | Burton et al. |
| 5,188,876 | A | 2/1993 | Hensel et al. |
| 5,423,735 | A | 6/1995 | Callinan et al. |
| 5,646,076 | A | 7/1997 | Bortz |
| 6,399,193 | B1 | 6/2002 | Ellison |
| 6,406,782 | B2 | 6/2002 | Johnson et al. |
| 7,842,363 | B2 | 11/2010 | Truog et al. |
| 8,247,054 | B2 | 8/2012 | Greer |
| 8,545,959 | B2 | 10/2013 | McGuire, Jr. et al. |
| 9,133,289 | B2 | 9/2015 | Suzuki |
| 9,452,587 | B2 | 9/2016 | Kisailus et al. |
| 2005/0022927 | A1* | 2/2005 | O'Connor .......... A47G 27/0437 156/249 |
| 2005/0144874 | A1 | 7/2005 | West et al. |
| 2006/0183389 | A1 | 8/2006 | Zafiroglu |
| 2006/0192342 | A1 | 8/2006 | West |
| 2007/0123652 | A1 | 5/2007 | Chu et al. |
| 2007/0163705 | A1 | 7/2007 | Dollase et al. |
| 2010/0047543 | A1 | 2/2010 | Lee et al. |
| 2010/0206478 | A1 | 8/2010 | Fujita et al. |
| 2010/0206953 | A1 | 8/2010 | O'Boyle |
| 2011/0171410 | A1 | 7/2011 | Nakagawa et al. |
| 2013/0194221 | A1 | 8/2013 | Takada et al. |
| 2018/0297340 | A1 | 10/2018 | Lima et al. |
| 2020/0109222 | A1 | 4/2020 | Anderson et al. |

FOREIGN PATENT DOCUMENTS

| | | |
|---|---|---|
| CN | 106089123 | 11/2018 |
| CN | 108794980 | 11/2018 |
| DE | 102007016734 A1 | 10/2008 |
| EP | 0569921 B1 | 1/2000 |
| EP | 3067202 A1 | 9/2016 |
| JP | 5598793 | 10/2014 |
| WO | 2007016617 A3 | 2/2007 |
| WO | 2007085421 A1 | 8/2007 |
| WO | 2009030802 A3 | 3/2009 |
| WO | 2009053734 A1 | 4/2009 |
| WO | 2011120348 A1 | 10/2011 |
| WO | 2011149706 A1 | 12/2011 |
| WO | 2018102198 A1 | 6/2018 |
| WO | 2018181424 A1 | 10/2018 |
| WO | 2019107352 A1 | 6/2019 |
| WO | 2019203099 A1 | 10/2019 |

* cited by examiner

PERMANENT, SELF-ADHERING, SELF-LUBRICATING, ANTI-WEAR COMPOSITE SYSTEM

CROSS REFERENCE TO RELATED APPLICATIONS

This application claims the benefit of U.S. Provisional Patent Application Ser. No. 62/889,183 filed on Aug. 20, 2019, which is incorporated herein by reference in its entirety.

TECHNICAL FIELD

The present invention is directed to an anti-wear composite structure and more specifically to an anti-wear composite structure having an anti-wear layer and a thermosetting resin, applied to one side of the anti-wear layer, configured to bond (e.g., temporarily bond or a precursor bond) to a substrate at an ambient temperature band via pressure-sensitive adhesion, having an onset to cure at ambient temperature and having a peak cure temperature greater than the ambient temperature band to mechanically and chemically bond (e.g., permanently bond) the anti-wear composite structure to a substrate.

BACKGROUND

Anti-wear materials can be installed in many areas of aerospace or industrial mating surfaces to prevent the galling or fretting resulting from metal on metal sliding wear. The anti-wear materials are traditionally adhered to a substrate using a two-part epoxy which is applied by hand. This method of adhesion is difficult, perhaps impossible, to apply evenly with typical aerospace bond lines of 0.002" to 0.004" thick. The prior art adhesives are difficult to clean, wasteful (e.g., flash and container loss) and have ambient curing times of 24 to 72 hours. Flash is adhesive that bleeds from the bond line during curing and container loss is the adhesive lost to the sides of the container during mixing/dispensing.

Based on the foregoing, there is a need to provide an improved anti-wear material that is easy to install and can overcome the foregoing limitations.

SUMMARY

The present invention includes an anti-wear composite structure that includes an anti-wear layer that has a wear surface opposite an adhesive receiving surface and a thermosetting resin applied to the adhesive receiving surface. The thermosetting resin includes a reactive adhesive configured to bond (e.g., temporarily bond or a precursor bond) the anti-wear composite structure to a substrate at an ambient temperature band (e.g., 22.22 degrees Celsius plus or minus 8.33 degrees Celsius; or 72 degrees Fahrenheit plus or minus 15 degrees Fahrenheit) via pressure-sensitive adhesion. The thermosetting resin has an onset to cure in the ambient temperature band and has a peak cure temperature greater than the ambient temperature band to mechanically and chemically bond (e.g., permanently bond) the anti-wear composite structure to a substrate.

In some embodiments, the anti-wear layer is a woven structure, such as, for example, a thermally-consolidated, fabric reinforced-polymer matrix with self-lubricating components integral to a weave and/or as an additive to the matrix.

In some embodiments, the woven structure is woven fabric that has a plurality of fibers interwoven with one another and polytetrafluoroethylene (PTFE) interwoven therewith. In some embodiments, the fibers include a polyester material, a stainless steel material, PTFE and/or glass material.

In some embodiments, the anti-wear layer is a thermally-consolidated, machinable, moldable or non-woven fabric, comprising a reinforced polymer matrix composite with self-lubricating materials integral to the non-woven fabric and/or as an additive to the matrix.

In some embodiments, the thermosetting resin is in the form of a tape calendered, or laminated, to one side of the anti-wear layer.

In some embodiments, the thermosetting resin is configured to be applied to the anti-wear layer in viscous form via resin application techniques comprising at least one of painting, brushing, rolling, and squeezing.

The thermosetting resin is configured to be dried to increase room temperature viscosity to allow for pressure sensitive adhesion without flash or squeeze-out during application to a substrate.

In some embodiments, a protective layer is removably adhered to the anti-wear layer and configured to be removed before or after bonding and before use in a service application.

In some embodiments, the protective layer includes indicia configured as advertising and/or instructions for installation and use.

In some embodiments, a release layer is removably adhered to the thermosetting resin and the release layer is configured to be entirely removed from the thermosetting resin prior to bonding to a substrate. The release layer can be made from a siliconized paper or polymer film.

The present invention includes a method of applying an anti-wear composite structure to a substrate. The method includes, providing an anti-wear composite structure having an anti-wear layer that has a layer of thermosetting resin applied to an adhesive receiving surface of the anti-wear layer; a protective layer that is removably adhered to a wear surface of the anti-wear layer; and a release layer that is removably adhered to a surface of the thermosetting resin. The method includes maintaining the anti-wear composite structure at a temperature more than 22.22 degrees Celsius (40 degrees Fahrenheit) below ambient temperature (e.g., below zero degrees Celsius; or below 32 degrees Fahrenheit) before installation to prevent premature curing of the thermo setting resin. The method includes removing a release layer from the thermosetting resin and the adhering the thermosetting resin portion of the anti-wear structure to the substrate via pressure-sensitive adhesion at ambient temperature. The method includes applying pressure to the anti-wear composite structure via the protective layer disposed on the anti-wear layer; and heating the anti-wear composite structure to a temperature sufficient to cure the thermosetting resin and mechanically and chemically bond the thermosetting resin to the substrate.

In some embodiments, the protective layer is removed from the anti-wear layer.

The present invention includes a method of manufacturing the anti-wear composite structure via forming the anti-wear composite structure into specific shapes via cutting, shaping, die stamping, computer numerical controlled machining (CNC) and/or hand trimming.

The present invention includes an anti-wear composite structure that includes an anti-wear layer that has a wear surface opposite an adhesive receiving surface. The anti-wear composite structure includes a thermosetting resin applied to the adhesive receiving surface. The anti-wear composite structure includes a protective layer that is removably adhered to the anti-wear layer and configured to be removed before or after bonding and before use in a service application. The anti-wear composite structure includes a release layer removably adhered to the thermosetting resin. The release layer is configured to be entirely removed from the thermosetting resin prior to bonding to the substrate. The thermosetting resin includes a reactive adhesive configured to bond the anti-wear composite structure to a substrate at an ambient temperature band via pressure-sensitive adhesion, that has an onset to cure in the ambient temperature band and has a peak cure temperature greater than the ambient temperature band to mechanically and chemically bond the anti-wear composite structure to the substrate.

In some embodiments, the thermosetting resin is configured to be dried to increase room temperature viscosity to allow for pressure sensitive adhesion without resin flowing from the bond line during application to the substrate.

The present invention includes an anti-wear composite structure that includes an anti-wear layer that has a wear surface opposite an adhesive receiving surface. The anti-wear composite structure includes a thermoplastic adhesive applied to the adhesive receiving surface. The thermoplastic adhesive is configured to removably bond the anti-wear composite structure to a substrate at a temperature of about 138 degrees Celsius (280 degrees Fahrenheit) to about 160 degrees Celsius (320 degrees Fahrenheit).

In some embodiments, the anti-wear composite structure includes a protective layer removably adhered to the anti-wear layer and configured to be removed before or after bonding and before use in a service application; and/or a release layer removably adhered to the thermoplastic adhesive, the release layer being configured to be entirely removed from the thermoplastic adhesive prior to bonding to the substrate.

DETAILED DESCRIPTION

Figure 1:
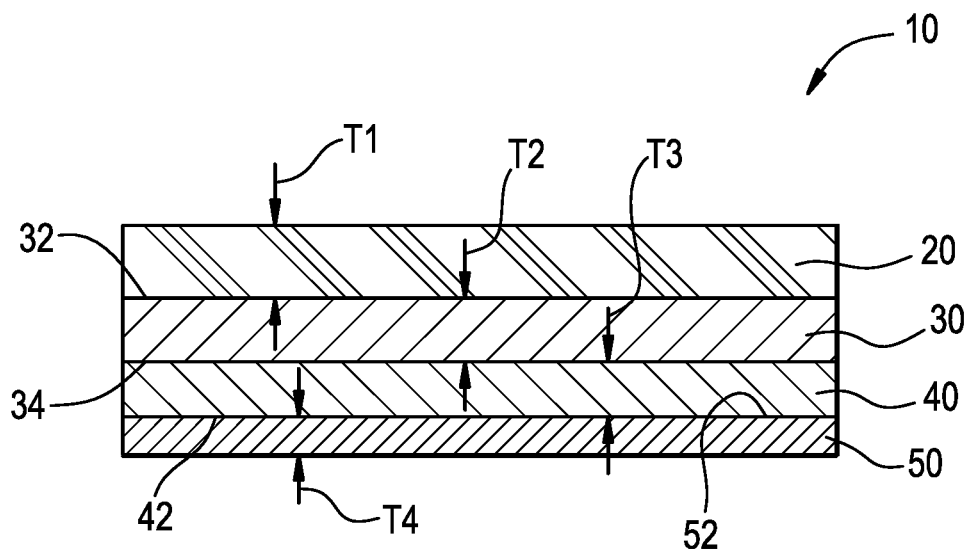
FIG. 1 is a cross sectional view of the anti-wear composite structure of the present invention.

As shown in FIG. 1, an anti-wear composite structure of the present invention is generally designated by the numeral 10. The anti-wear composite structure 10 includes an anti-wear layer 30 (e.g., a solid-state, self-lubricating, anti-wear, composite layer, a sheet, a film or a thickness) having a wear surface 32 opposite an adhesive receiving surface 34. Thus, the wear surface 32 and the adhesive receiving surface 34 are on opposing sides of the anti-wear layer 30. The anti-wear composite structure 10 includes a thin layer of thermosetting resin 40 (i.e., adhesive) applied to the adhesive receiving surface 34.

In some embodiments, the thermosetting resin 40 (i.e., adhesive) applied only to the adhesive receiving surface 34. In some embodiments, the thermosetting resin 40 is applied to the entire adhesive receiving surface 34. In one embodiment, the thermosetting resin 40 is applied to portions of the adhesive receiving surface 34, for example in a pattern. The thermosetting resin 40 is applied uniformly (i.e., a predetermined thickness) to the adhesive receiving surface 34 of the anti-wear layer 30.

While the thermosetting resin 40 is shown and described as being applied uniformly (i.e., a predetermined thickness) to the adhesive receiving surface 34 of the anti-wear layer 30, the present invention is not limited in this regard as the thermosetting resin 40 may be applied in non-uniform and various thicknesses to the adhesive receiving surface 34 of the anti-wear layer 30 to comport with non-uniform shape, contour or irregularities in the surface of a substrate 60 that the anti-wear composite structure 10 is applied to.

While FIG. 1 illustrates the anti-wear composite structure 10 as being generally flat with the protective layer 20, anti-wear layer 30, the layer of thermosetting resin 40 and the release layer 50 being substantially flat and parallel to one another, the present invention is not limited in this regard as the anti-wear composite structure 10 may have other shapes and configurations including but not limited to arcuate shapes and shapes with corners. In one embodiment, the anti-wear composite structure 10 is flexible, pliable and is conformable to a shape (e.g., arcuate shape) of the substrate 60.

Figure 3:
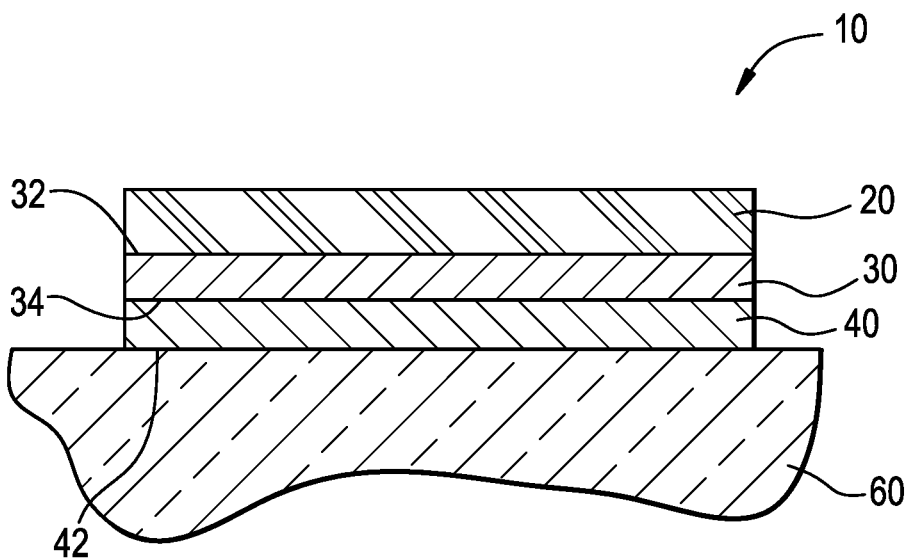
FIG. 3 is a cross sectional view of the anti-wear composite structure of the present invention shown with the release layer peeled off and the anti-wear composite structure adhered to a substrate.

The thermosetting resin 40 includes a reactive adhesive that has a first bonding step and a second bonding step. During the first bonding step the reactive adhesive is configured to initially bond (e.g., temporarily bond or a precursor bond) the anti-wear composite structure 10 to a substrate 60 (see FIG. 3) at an ambient temperature band (e.g., 22.22 degrees Celsius plus or minus 8.33 degrees Celsius; or 72 degrees Fahrenheit plus or minus 15 degrees Fahrenheit) via pressure-sensitive adhesion. The first bonding steps allows the thermosetting resin 40 of the anti-wear composite structure 10 to be positioned on the substrate in preparation for performing the second bonding step. After the first bonding step is complete, the second bonding step is performed. The thermosetting resin 40 has an onset to cure and high tack in the ambient temperature band and has a peak cure temperature greater than the ambient temperature band to perform the second bonding step which mechanically and chemically bonds (e.g., permanently bonds) the anti-wear composite structure 10 to the substrate 60 (e.g., metal or composite substrate). The anti-wear composite structure 10 is clean-handling, easy to install, dimensionally uniform, can be fixed to any roughened substrate similar to a pressure sensitive adhesion material, and cures when heated under pressure, for example under autoclave in 1 hour.

During the second bonding step, the reactive adhesive in thermosetting resin 40 of the anti-wear composite structure 10 is cured at a pressure of 2.06843 Bar to 6.89476 Bar (30 to 100 pounds per square inch), a temperature of 148.89 degrees Celsius to 204.444 degrees Celsius (300 to 400 degrees Fahrenheit) with a range of time from 30 to 90 minutes. In one embodiment, during the second bonding step the reactive adhesive in thermosetting resin 40 of the anti-wear composite structure 10 is cured at a pressure of 3.44738 Bar (50 pounds per square inch-) and a temperature of 176.667 degrees Celsius (350 degrees Fahrenheit) for 60 minutes.

Figure 6:
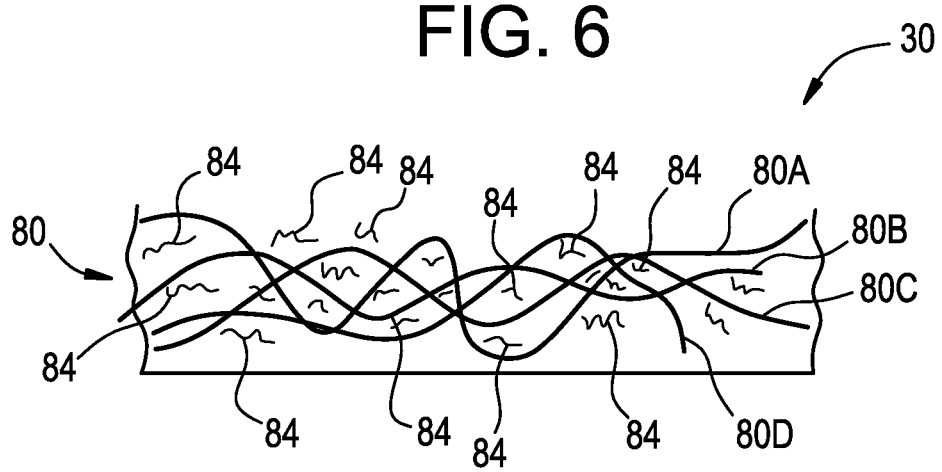
FIG. 6 is a schematic cross sectional view of a woven anti-wear layer.
Figure 7:
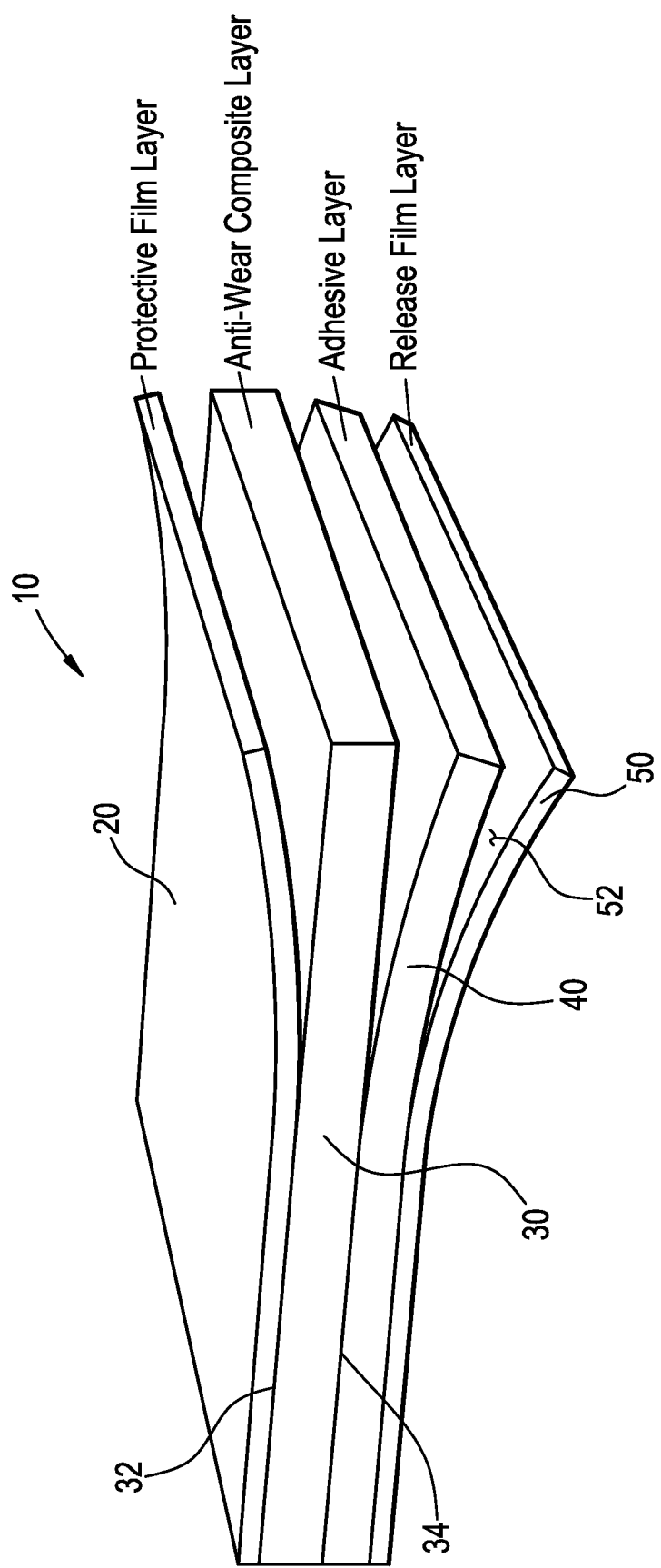
FIG. 7 is an exploded perspective view of the anti-wear composite structure of the present invention.

As shown in FIG. 6, in some embodiments the anti-wear layer 30 includes a woven structure 80. The woven structure 80 is made up of a thermally-consolidated, fabric reinforced-polymer matrix with self-lubricating components integral to a weave and/or as an additive to the matrix. The woven structure 80 includes a woven fabric that has a plurality of fibers 80A, 80B, 80C, and 80D interwoven with one another and polytetrafluoroethylene (PTFE) fibers 84 interwoven therewith. The fibers 80A, 80B, 80C, and 80D include those made of a polyester material, a stainless steel material, a PTFE material and a glass material or combinations thereof.

In some embodiments, the anti-wear layer 30 is a thermally-consolidated, machinable, moldable or non-woven fabric that has a reinforced polymer matrix composite with self-lubricating materials integral to the non-woven fabric and/or as an additive to the matrix.

In some embodiments, the thermosetting resin 40 is in the form of a tape calendered, or laminated, to one side of the anti-wear layer 30. In some embodiments, the thermosetting resin 40 is configured to be applied to the anti-wear layer in viscous form via resin application techniques comprising at least one of painting, brushing, rolling, and squeezing.

In some embodiments, the thermosetting resin 40 is configured to be dried to increase room temperature viscosity to allow for pressure sensitive adhesion without resin flowing from the bond line during application to a substrate 60.

Figure 4:
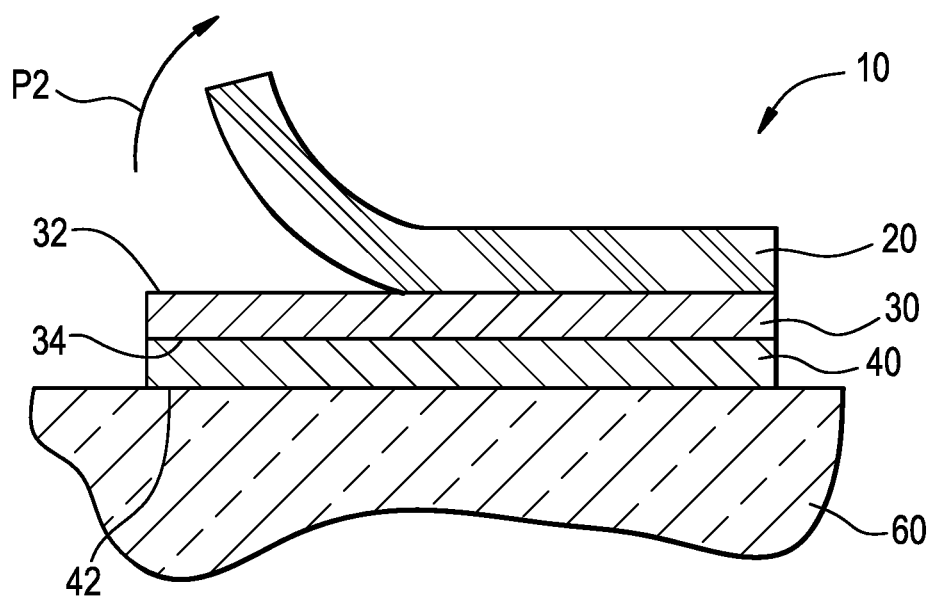
FIG. 4 is a cross sectional view of the anti-wear composite structure of the present invention shown with a protective layer being peeled off.
Figure 5:
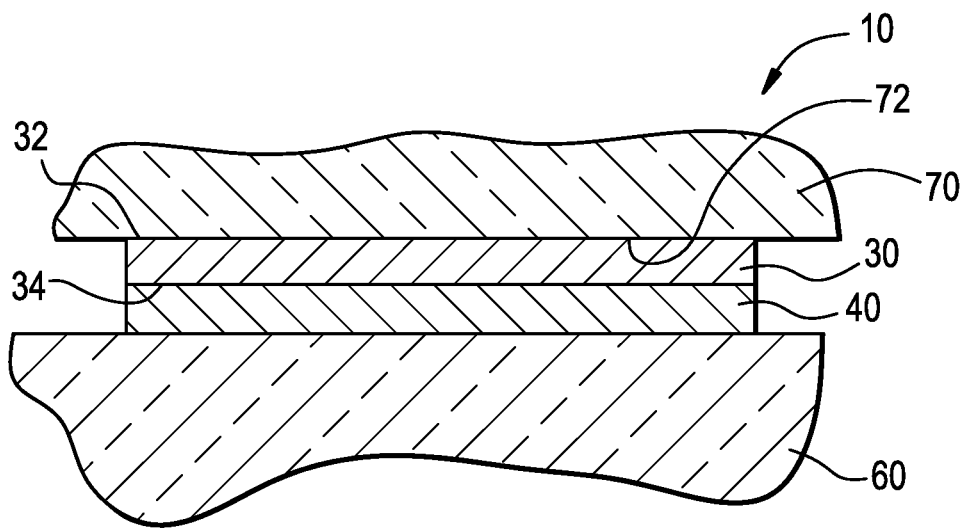
FIG. 5 is a cross sectional view of the anti-wear composite structure of the present invention shown with the proactive layer and release layer peeled off and the anti-wear composite structure cured and adhered to the substrate.

As shown in FIG. 1, a protective layer 20 is semi-permanently adhered to (i.e., removably adhered to) the anti-wear layer 30 and is configured to be removed before or after bonding and before use in a service application. The protective layer 20 is shown in the process of being removed (e.g., peeled off as indicated by the arrow P2) from the anti-wear layer 30 in FIG. 4. FIG. 5 illustrates the anti-wear composite structure 10 cured bonded (e.g., permanently bonded) on the substrate with both the protective layer 20 and the release layer 50 removed therefrom. In some embodiments, the protective layer 20 includes indicia such as advertising and/or instructions for installation and use printed or formed thereon. The protective layer 20 is manufactured from a non-porous material, such as a polyester film to uniformly distribute pressure across the surface of the anti-wear composite structure 10 during the heat and pressure application stage of the curing and bonding process. The protective layer 20 also prevents premature damage to the anti-wear layer 30 before installation, for example during shipping and handling.

Figure 2:
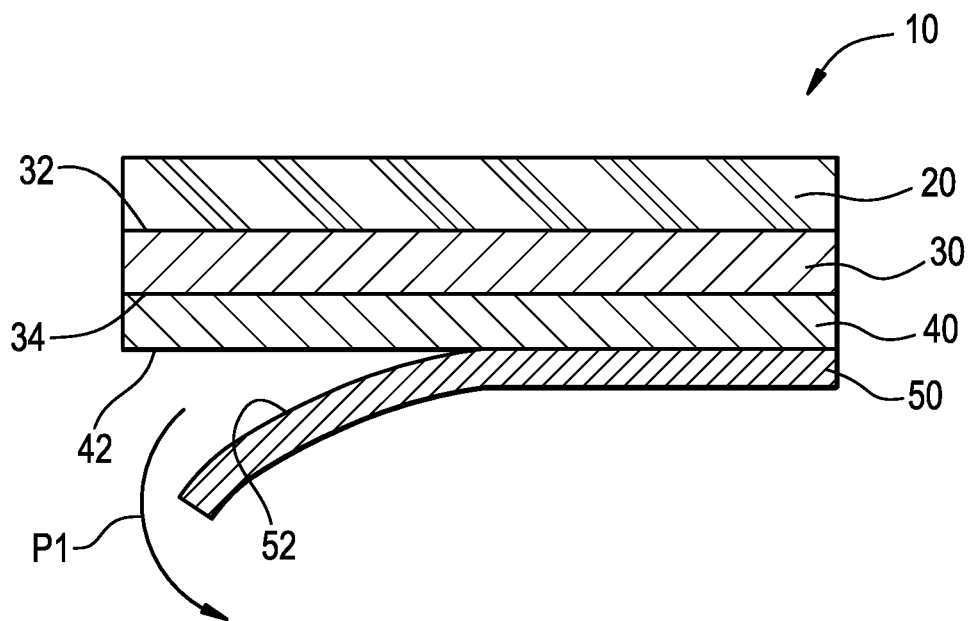
FIG. 2 is a cross sectional view of the anti-wear composite structure of the present invention shown with a release layer being peeled off.

As shown in FIG. 1, the anti-wear composite structure 10 includes a release layer 50 semi-permanently adhered to or removably adhered to a surface 42 of the thermosetting resin 40. The release layer is configured to be entirely removed from the thermosetting resin 40 prior to bonding to a substrate 60. The release layer 50 is shown in a process being removed (e.g., peeled off) in FIG. 2, as indicated by the arrow P1. In some embodiments, the release 50 layer is a siliconized paper or polymer film 52.

The protective layer 20 has a thickness T1 in the range of 0.00508 cm to 0.03048 cm (0.002 inches to 0.012 inches). The anti-wear layer 30 has a thickness T2 in the range of 0.00508 cm to 0.3048 cm (0.002 inches to 0.120 inches). The thermosetting resin 40 has a thickness T3 in the range of 0.00508 cm to 0.0254 cm (0.002 inches to 0.010 inches). The release layer 50 has a thickness T4 in the range of 0.00508 cm to 0.03048 cm (0.002 inches to 0.012 inches).

As shown in FIG. 5, the wear surface 32 of the anti-wear layer 30 is in sliding engagement with a mating surface 72 of component 70. The anti-wear layer 30 provides resistance to galling and fretting of the mating surface 72 while providing a low friction interface between the anti-wear layer 30 and the mating surface 72.

Figure 8:
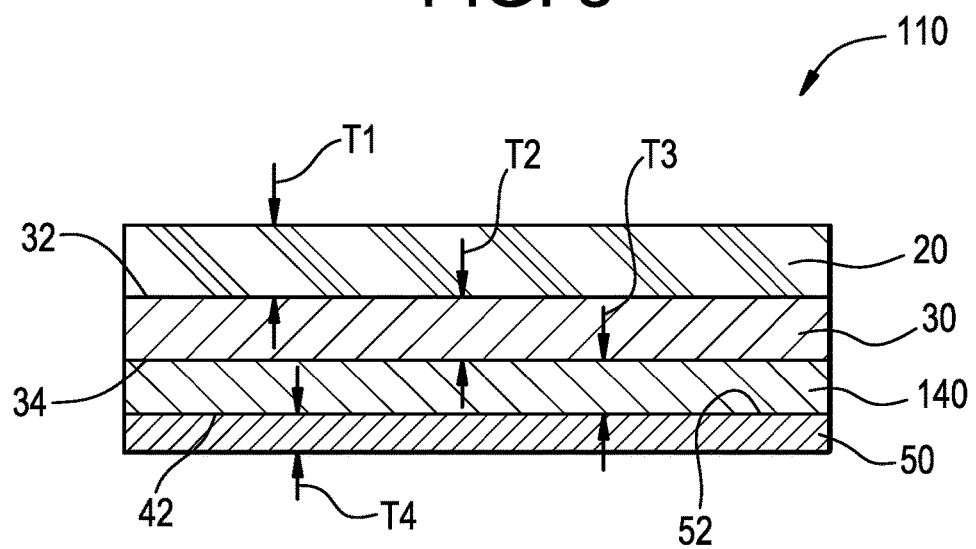
FIG. 8 is a cross sectional view of the anti-wear composite structure of the present invention with a thermoplastic tape.

While FIGS. 1-5 show and describe the anti-wear composite structure 10 with the thin layer of thermosetting resin 40 applied to the adhesive receiving surface 34 of the anti-wear layer 30, the present invention is not limited in this regard as the thin layer of thermosetting resin 40 may be replaced with a thin layer of thermoplastic adhesive tape 140, as shown in FIG. 8 for the anti-wear composite structure 110. The thin layer of thermoplastic adhesive tape 140 is applied to the adhesive receiving surface 34 of the anti-wear layer 30 via a suitable process such as calendaring. In one embodiment, the thermoplastic adhesive tape 140 is a thermoplastic polyurethane and is installed with heat to about 138 degrees Celsius (280 degrees Fahrenheit) to about 160 degrees Celsius (320 degrees Fahrenheit) and preferable to approximately 149 degrees Celsius (300 degrees Fahrenheit). The anti-wear composite structure 110 has the release layer 50 applied to the surface 42 of the thermoplastic adhesive tape 140. In addition, the protective layer 20 is applied to the wear surface 32 of the anti-wear layer 30.

Figure 9:
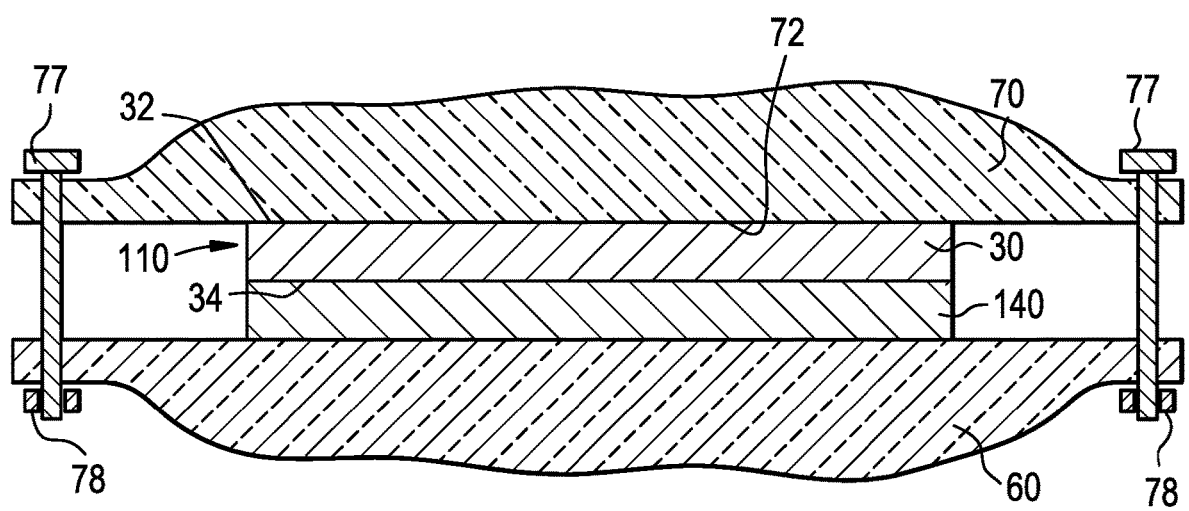
FIG. 9 is a is a cross sectional view of the anti-wear composite structure FIG. 8 shown with the proactive layer and release layer peeled off, the anti-wear composite structure cured and adhered to the substrate and a panel.

The anti-wear composite structure 110 shown in FIG. 8 is suitable for situations where an anti-wear layer 30 requires temporary fixation to a panel because the panel will ultimately be fixed by mechanical means to a substrate. For example, as shown in FIG. 9, the anti-wear composite structure 110 has the protective layer 20 removed and the release layer 50 removed. The anti-wear layer 30 is removably adhered to the substrate 60 (e.g., a panel) with the thermoplastic adhesive tape 140 by heating to approximately 149 degrees Celsius (300 Fahrenheit). The substrate 60 is mechanically secured to the component 70 with mechanical fasteners such as bolts 77 and nuts 78. The anti-wear layer 30 prevents galling of the mating surface 72 of the component 70. When it comes time to replace the anti-wear composite structure 110, the thermoplastic adhesive tape 140 will peel away cleanly from the substrate 60, with minimal effort.

The substrate 60 has a service temperature of −54 degrees Celsius to 52 degrees Celsius (65 degrees Fahrenheit to 125 degrees Fahrenheit) The overall advantage of the thermoplastic adhesive tape 140 is ease (and speed) of installation and cleanup at the sacrifice of a permanent chemical bond (which imparts creep resistance, temperature resistance, modulus, strength and chemical resistance). If for some reason, the substrate 60 reached the melting temperature of the thermoplastic adhesive tape 140, the thermoplastic adhesive tape 140 would lose structure, but would this be inconsequential due to the mechanical fixation of the substrate 60 to the component 70.

The present invention also includes a method of applying an anti-wear composite structure 10 to a substrate 60. The method includes providing the anti-wear composite structure 10 illustrated in FIG. 1, including providing the anti-wear layer 30 having the thin layer of thermosetting resin 40 applied to the adhesive receiving surface 34; the protective layer 20 removably adhered to the wear surface 34 of the anti-wear layer 30; and the release layer 50 removably adhered to the surface 42 of the thermosetting resin 40. The temperature of the anti-wear composite structure 10 is maintained at a temperature more than 22.22 degrees Celsius (40 degrees Fahrenheit) below ambient temperature of 22.22 degrees Celsius (72 degrees Fahrenheit) before installation on the substrate 60 to prevent premature curing of the thermo setting resin 40. For example, the anti-wear composite structure 10 is maintained at a temperature below zero degrees Celsius (below 32 degrees Fahrenheit). The method includes removing the release layer 50 from the thermosetting resin 40. The thermosetting resin 50 portion of the anti-wear structure 10 is adhered (e.g., temporarily bonded or precursor bonded) to the substrate 60 via pressure-sensitive adhesion at ambient temperature (e.g. 22.22 degrees Celsius plus or minus 8.33 degrees Celsius; or 72 degrees Fahrenheit plus or minus 15 degrees Fahrenheit). The method includes applying pressure to the anti-wear composite structure 10 via the protective layer 20. The method further includes heating the anti-wear composite structure 10 to a temperature sufficient to cure the thermosetting resin and mechanically and chemically permanently bond to the substrate 60. The curing of the thermosetting resin 40 can further include applying pressure to the anti-wear composite structure 10, for example, via application of pressure to the protective layer 20.

The method further includes removing the protective layer 20 from the anti-wear layer 30.

There is disclosed herein a method of manufacturing the anti-wear composite structure 10 that includes forming the anti-wear composite structure 10 to specific shapes via at least one of cutting, shaping, die stamping, computer numerical controlled machining (CNC) and hand trimming.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An anti-wear composite structure comprising:
   an anti-wear layer having a wear surface opposite an adhesive receiving surface, the wear surface being configured for sliding engagement with a mating surface; and
   a layer of thermoplastic adhesive tape applied to the adhesive receiving surface;
   wherein the layer of thermoplastic adhesive tape is configured to removably bond the anti-wear composite structure to a substrate at a temperature of about 138 degrees Celsius (280 degrees Fahrenheit) to about 160 degrees Celsius (320 degrees Fahrenheit).

2. The anti-wear composite structure of claim 1, further comprising at least one of:
   a protective layer removably adhered to the anti-wear layer and configured to be removed before or after bonding and before use in a service application; and
   a release layer removably adhered to the thermoplastic adhesive tape, the release layer being configured to be entirely removed from the thermoplastic adhesive prior to bonding to the substrate.

3. An anti-wear composite structure comprising:
   an anti-wear layer having a wear surface opposite an adhesive receiving surface, the wear surface being configured for sliding engagement with a mating surface; and
   a layer of thermosetting resin adhesive applied to the adhesive receiving surface;
   wherein the layer of thermosetting resin adhesive comprises a reactive adhesive configured to bond the anti-wear composite structure to a substrate at an ambient temperature band via pressure-sensitive adhesion, having an onset to cure in the ambient temperature band and having a peak cure temperature greater than the ambient temperature band to mechanically and chemically bond the anti-wear composite structure to the substrate;
   wherein the layer of thermosetting resin has a premature curing temperature of zero degrees Celsius (32 degrees Fahrenheit) below which the thermosetting resin does not prematurely cure.

4. The anti-wear composite structure of claim 3, wherein the anti-wear layer comprises a woven structure.

5. The anti-wear composite structure of claim 4, wherein the woven structure comprises a thermally-consolidated, fabric reinforced-polymer matrix with self-lubricating components being at least one of integral to a weave and as an additive to the matrix.

6. The anti-wear composite structure of claim 4, wherein the woven structure comprises woven fabric comprising a plurality of fibers interwoven with one another and polytetrafluoroethylene interwoven therewith.

7. The anti-wear composite structure of claim 6, wherein the fibers comprise at least one of a polyester material, a stainless steel material, polytetrafluoroethylene and glass material.

8. The anti-wear composite structure of claim 3, wherein the anti-wear layer is a thermally-consolidated, machinable, moldable or non-woven fabric, comprising a reinforced polymer matrix composite with self-lubricating materials integral to the non-woven fabric and/or as an additive to the matrix.

9. The anti-wear composite structure of claim 3, wherein the layer of thermosetting resin is in the form of a tape calendered, or laminated, to one side of the anti-wear layer.

10. The anti-wear composite structure of claim 3, wherein the layer of thermosetting resin is configured to be applied to the anti-wear layer in viscous form via resin application techniques comprising at least one of painting, brushing, rolling, and squeezing.

11. The anti-wear composite structure of claim 10, wherein the protective layer comprises indicia configured as advertising and/or instructions for installation and use.

12. The anti-wear composite structure of claim 3, wherein the layer of thermosetting resin is configured to be dried to increase room temperature viscosity to allow for pressure sensitive adhesion without resin flowing from the bond line during application to the substrate.

13. The anti-wear composite structure of claim 3, further comprising a protective layer removably adhered to the anti-wear layer and configured to be removed before or after bonding and before use in a service application.

14. The anti-wear composite structure of claim 3, further comprising a release layer removably adhered to the layer of thermosetting resin, the release layer being configured to be entirely removed from the thermosetting resin prior to bonding to the substrate.

15. The anti-wear composite structure of claim 3, wherein the release layer comprises a siliconized paper or polymer film.

16. A method of manufacturing the anti-wear composite structure of claim 3 comprising forming the anti-wear composite structure to specific shapes via at least one of cutting-, shaping, die stamping, computer numerical controlled machining and hand trimming.

17. An anti-wear composite structure comprising:
   an anti-wear layer having a wear surface opposite an adhesive receiving surface, the wear surface being configured for sliding engagement with a mating surface; and
   a layer of thermosetting resin adhesive applied to the adhesive receiving;
   a protective layer removably adhered to the anti-wear layer and configured to be removed before or after bonding and before use in a service application;
   a release layer removably adhered to the layer of thermosetting resin adhesive, the release layer being configured to be entirely removed from the layer of thermosetting resin adhesive prior to bonding to the substrate;
   wherein the layer of thermosetting resin adhesive comprises a reactive adhesive configured to bond the anti-wear composite structure to a substrate at an ambient temperature band via pressure-sensitive adhesion, having an onset to cure in the ambient temperature band and having a peak cure temperature greater than the ambient temperature band to mechanically and chemically bond the anti-wear composite structure to the substrates;
   wherein the layer of thermosetting resin has a premature curing temperature of zero degrees Celsius (32 degrees Fahrenheit) below which the thermosetting resin does not prematurely cure.

18. The anti-wear composite structure of claim 17, wherein the layer of thermosetting resin is configured to be dried to increase room temperature viscosity to allow for pressure sensitive adhesion without resin flowing from the bond line during application to the substrate.

* * * * *